(12) United States Patent
Pfingsten et al.

(10) Patent No.: US 8,578,883 B2
(45) Date of Patent: Nov. 12, 2013

(54) PET EXCLUDING PET FEEDER

(75) Inventors: Troy Pfingsten, Plymouth, MN (US); Mark O'Melia, Minneapolis, MN (US)

(73) Assignee: The Food Safe, LLC., Plymouth, MN (US)

( * ) Notice: Subject to any disclaimer, the term of this patent is extended or adjusted under 35 U.S.C. 154(b) by 264 days.

(21) Appl. No.: 12/630,969

(22) Filed: Dec. 4, 2009

(65) Prior Publication Data

US 2010/0139570 A1 Jun. 10, 2010

Related U.S. Application Data

(60) Provisional application No. 61/119,958, filed on Dec. 4, 2008.

(51) Int. Cl.
*A01K 1/035* (2006.01)

(52) U.S. Cl.
USPC .............................................. 119/63; 119/501

(58) Field of Classification Search
USPC .............................. 119/496–501, 63, 484, 59
See application file for complete search history.

(56) References Cited

U.S. PATENT DOCUMENTS

| | | | |
|---|---|---|---|
| 2,522,391 A * | 9/1950 | McGonigle | 119/453 |
| 3,861,356 A | 1/1975 | Kulka | |
| 4,188,912 A | 2/1980 | Smalley | |
| 4,334,501 A | 6/1982 | McDaniel et al. | |
| 4,426,955 A | 1/1984 | Monroe et al. | |
| 4,653,431 A | 3/1987 | Owen | |
| 5,133,291 A | 7/1992 | Justice | |
| 5,669,328 A | 9/1997 | Lanfranchi | |
| 5,724,914 A | 3/1998 | Nemeth | |
| 5,884,582 A | 3/1999 | Duckworth | |
| 6,318,294 B1 | 11/2001 | Richmond et al. | |
| 6,408,796 B1 * | 6/2002 | Hampel | 119/498 |
| 6,546,895 B2 | 4/2003 | Bonner | |
| 6,588,367 B1 | 7/2003 | MacManus | |
| 6,915,761 B1 | 7/2005 | Campbell | |
| 7,017,518 B2 | 3/2006 | Zolnierz et al. | |
| 7,124,707 B1 | 10/2006 | Clarke | |
| 7,228,816 B2 | 6/2007 | Turner et al. | |
| 2001/0032594 A1 | 10/2001 | Bickley | |
| 2002/0112674 A1 * | 8/2002 | Lerner | 119/497 |
| 2002/0179018 A1 | 12/2002 | Bonner | |
| 2005/0217591 A1 | 10/2005 | Turner et al. | |
| 2005/0284405 A1 * | 12/2005 | Pomakoy-Poole et al. | 119/497 |
| 2006/0096545 A1 | 5/2006 | Cone et al. | |
| 2006/0249088 A1 | 11/2006 | Eu | |
| 2007/0107667 A1 | 5/2007 | Morris | |
| 2007/0125306 A1 | 6/2007 | Beecher | |
| 2007/0193524 A1 | 8/2007 | Turner et al. | |
| 2009/0229534 A1 * | 9/2009 | Fredericks | 119/484 |

FOREIGN PATENT DOCUMENTS

| | | |
|---|---|---|
| WO | 92/16102 A1 | 10/1992 |
| WO | 02/076191 A2 | 10/2002 |
| WO | 2004/091289 A2 | 10/2004 |
| WO | 2005/092019 A2 | 10/2005 |

* cited by examiner

*Primary Examiner* — Monica Williams
*Assistant Examiner* — Brian M O'Hara
(74) *Attorney, Agent, or Firm* — Dardi & Herbert, PLLC.; Curtis B. Herbert (57) ABSTRACT

A pet feeder for feeding pets that provides an enclosure that the pet accesses through an entryway having dimensions under the control of the pet owner. The owner sizes the entryway to exclude a pet with allowing a relatively smaller pet to enter.

19 Claims, 13 Drawing Sheets

PET EXCLUDING PET FEEDER

CROSS REFERENCE TO RELATED APPLICATIONS

This patent application claims priority to U.S. Ser. No. 61/119,958 filed Dec. 4, 2008, which is hereby incorporated by reference herein.

TECHNICAL FIELD

The technical field relates to pet feeders and more particularly to a feeder that allows feeding of one pet but not another pet.

BACKGROUND

Pet owners may have more than one pet. Pets typically receive food from a bowl that the pet owner periodically refills. The pets sometimes compete for the food or eat food intended for other pets.

SUMMARY OF THE INVENTION

A pet feeder is provided that allows an owner to selectively feed one pet and exclude another pet. The feeder provides a cover over a food bowl that allows a smaller pet to access the food while excluding a larger pet. The cover can not be dislodged by the larger animal. The feeder has an entryway that can be sized by the pet owner, e.g., by sliding a door across an access opening. These and other embodiments are described herein.

DETAILED DESCRIPTION OF PREFERRED EMBODIMENTS

Figure 1:
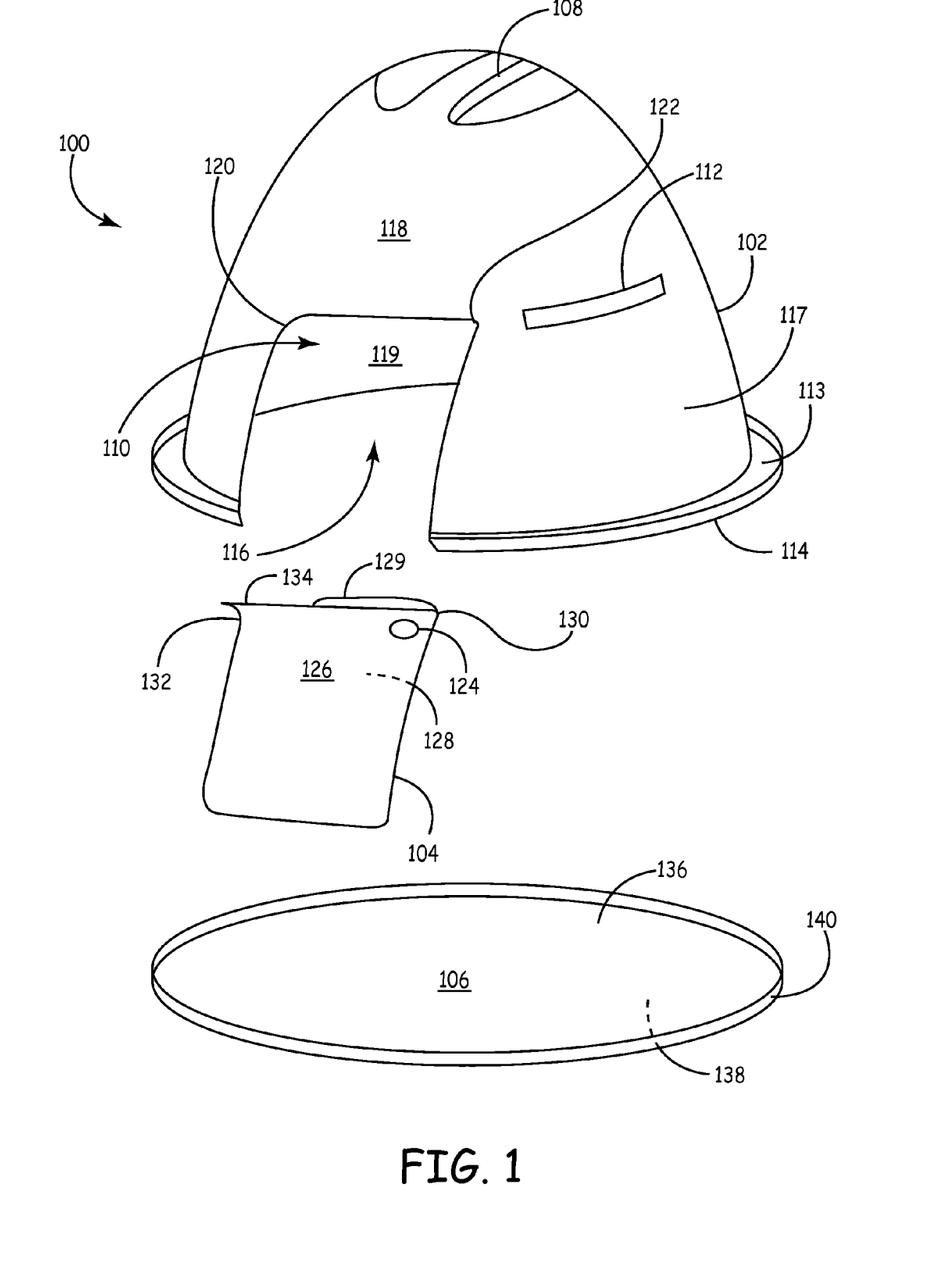
FIG. 1 is an assembly view of a pet feeder.

FIG. 1 depicts assembly for pet feeder 100 having cover 102, door 104, and base 106. Cover 102 has handle 108, access opening 110, door control slot 112, skirt 113, flange 114, interior space 116 defined by shell 118. Access opening 110 has rounded corner 120 and right angle corner 122. Shell 118 has exterior side 117 and interior side 119. Door 104 has knob 124, exterior side 126, interior side 128, lip 129, right angle corner 130, and arcuate portion 132 at corner 134. Base 106 has interior side 136, exterior side 138, and lip 140.

Figure 2:
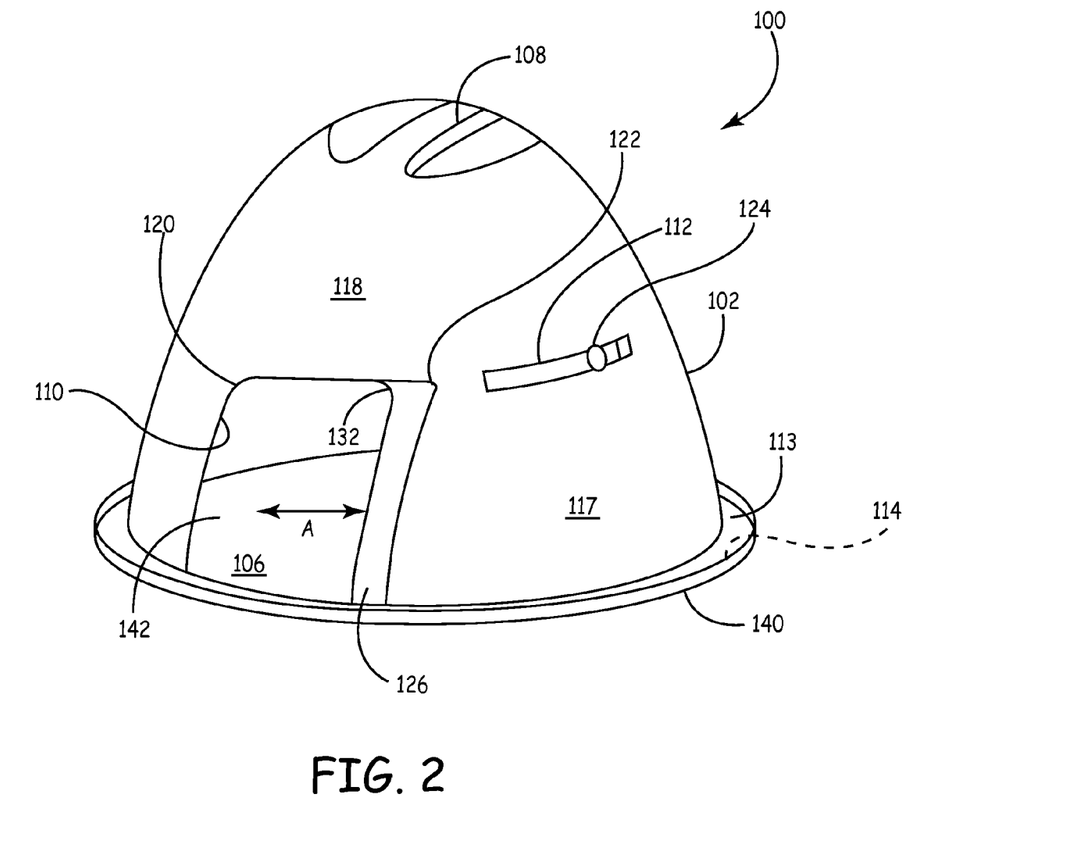
FIG. 2 is a perspective view of the assembly of FIG. 1.
Figure 3:
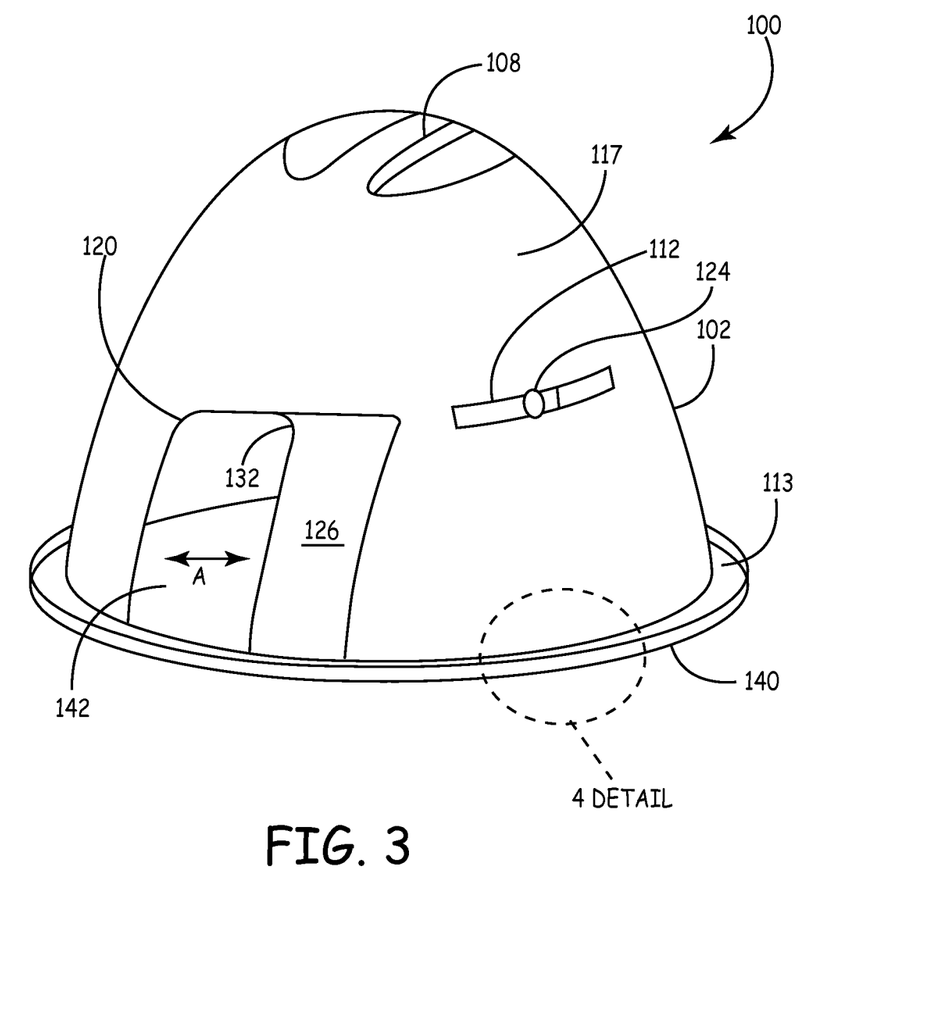
FIG. 3 is a perspective view of the assembly of FIG. 2, with the entryway being a different size after movement of the door.

FIG. 2 depicts pet feeder 100 assembled, with door 104 blocking access opening 110 and with knob 124 protruding through door control slot 112. Arrow A indicates motion of door 104 within access opening 110. Entryway 142 allows access to interior space 116 and is an opening between door 104 and shell 118. FIG. 3 depicts the pet feeder 100 with door 104 further blocking access opening 110 with entryway 142 being relatively smaller that as depicted in FIG. 2. Knob 124 is also moved relative to its position in FIG. 2.

The base defines a bottom, with the feeder resting on the base during normal intended use. A vertical axis from the center of the base defines up and down directions, with the base being the bottom and beneath the cover. A lateral access thus refers to an access from the sides of the base as opposed to the top of the feeder. A pet would enter the lateral opening. A vertical opening in the top may further be provided, e.g., for a user to reach into the feeder interior to replace food; such an opening may be further equipped with a reversibly removable lid. Alternatively, a lid attached to the container may be used that is reversibly openable, with an open position allowing access and a closed position covering the opening; e.g., a lid attached to the shell via a living hinge and snap-fitting into place to cover the vertical opening.

Figure 4:
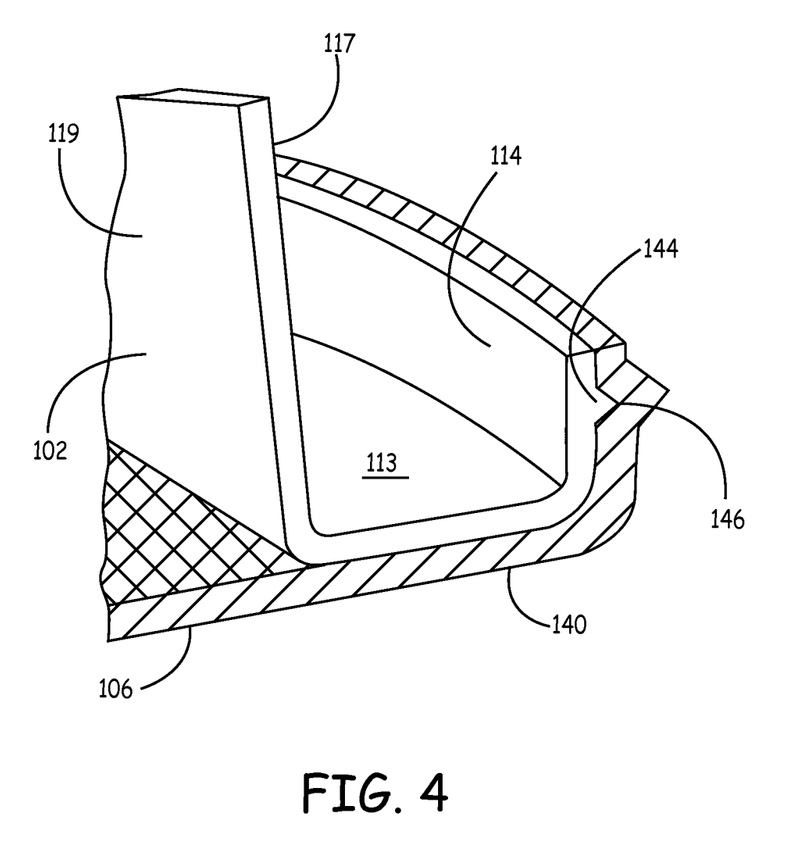
FIG. 4 is a cross-sectional view of detail 4 of FIG. 3.

FIG. 4 is an enlarged view of detail 4 of FIG. 3. Shell skirt 113 has flange 114 that includes tongue 144 that is received by groove 146. Groove 146 is in lip 140 that is part of base 106.

Referring to FIGS. 1-4, an assembler fits door 104 into cover 102, with lip 129 cooperating with a rim or other structure (not shown) on cover interior side 119. Knob 124 may be pushed through slot 112 or alternatively knob 124 may be reversibly fastenable to door 104 and attached to door 104 after it is fit into the cover 102. The term knob is broad and includes, e.g., a handle, knurl, or post. The cover 102 is then pressed onto base 106, with flange 114 and lip 140 fitting together so that pets (with the term pet being a broad term) can not readily separate cover 102 from base 106. As in FIG. 4, flange 114 may have tongue 144 that is received by groove 146 in lip 140. The flange and/or lip and/or rim flexes as the cover and base are joined and form an interlocking structure.

Figure 5:
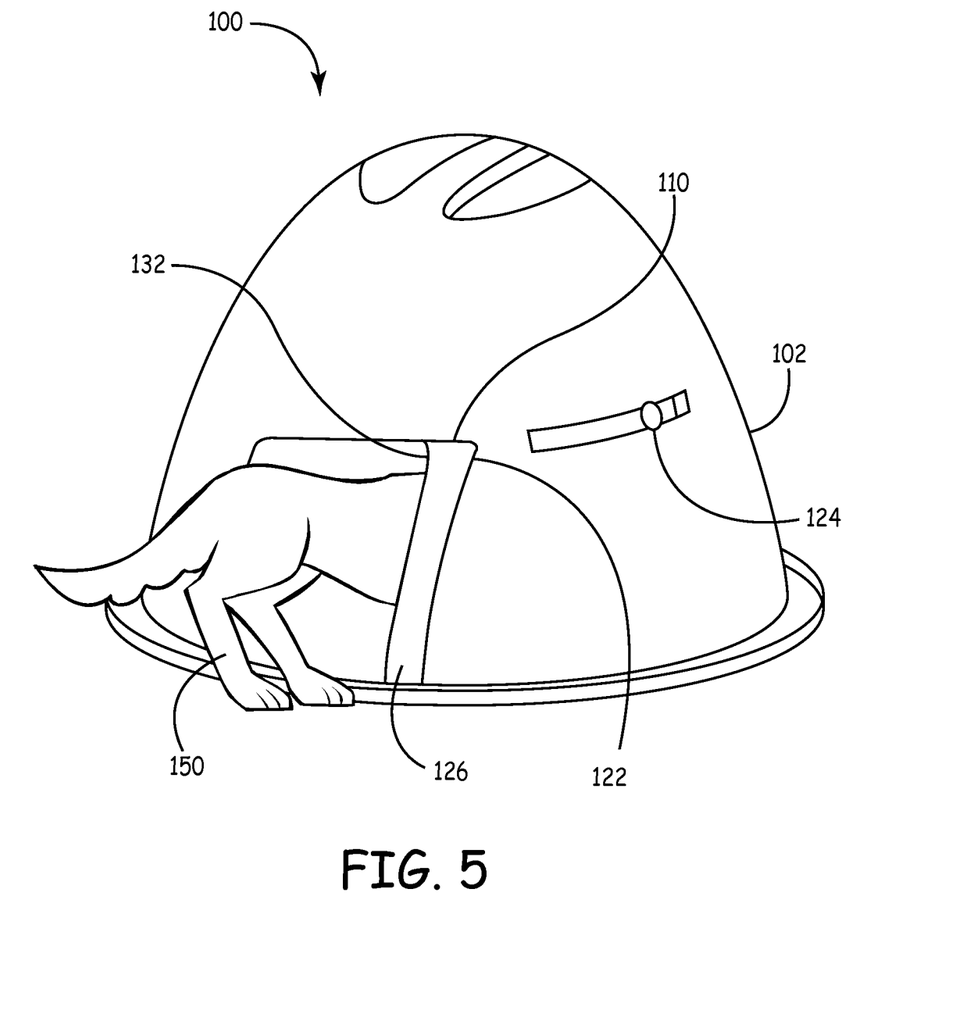
FIG. 5 is a perspective view that depicts a pet using the embodiment of FIGS. 1-4.

The user adjusts door 104 to create an entryway 142 of a desired size. In general, the entryway 142 is sized to allow a smaller pet to enter or put its head into interior space 116 to access food therein while excluding access by a relatively larger animal. In use, as at FIG. 5, a pet 150 enters through entryway 142 to access food and/or water or other pet items. Other relatively larger animals are excluded.

The interior may be made to accommodate any of a variety of pets. Accordingly, embodiments include various sizes, with an exemplary range being from 0.5 to 10 cubic feet; artisans will immediately appreciate that all the ranges and values within the explicitly stated ranges are contemplated, e.g., 1 cubic foot, 2 cubic feet, or from 1-5 cubic feet.

The interior may be sized to provide for a pet to enter completely into the feeder. This arrangement has the advantage that food and/or water can be placed far away enough from the entrance so that the larger animals cannot reach in to access the food. Alternatively, the feeder may be sized to allow only partial access of the pet.

Figure 6:
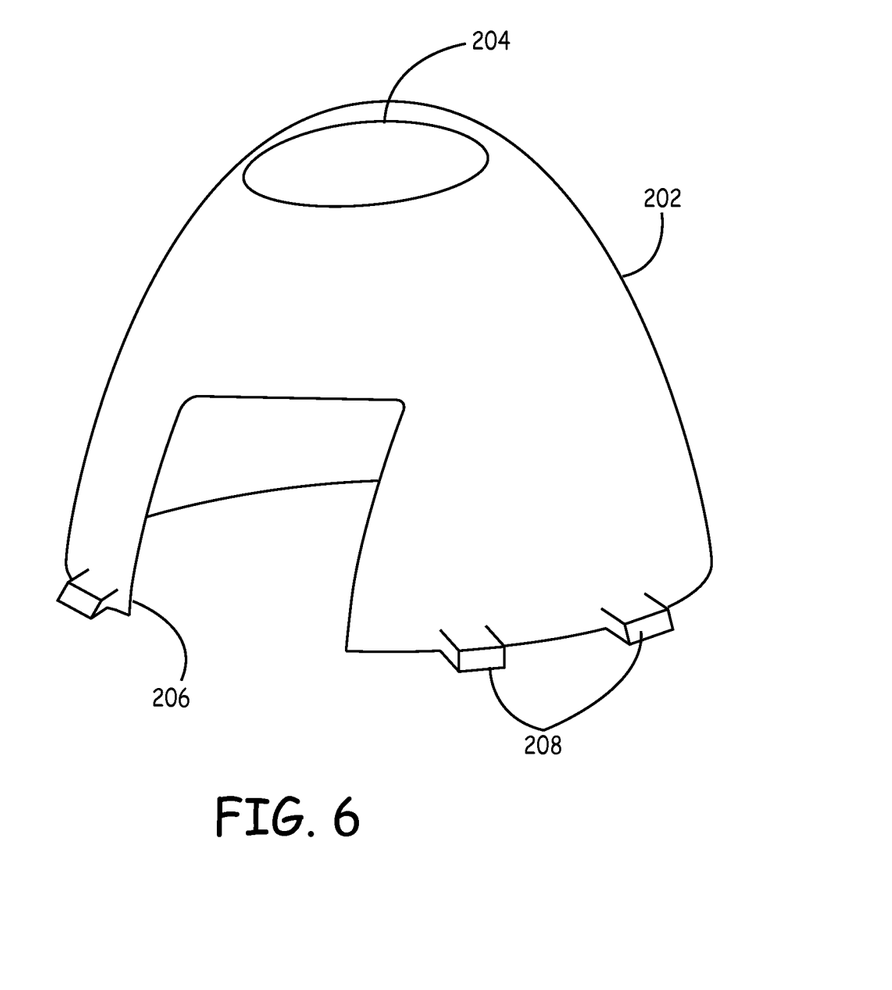
FIG. 6 is perspective view of an alternative embodiment of a cover.

FIG. 6 depicts an alternative cover 202 with vertical opening 204 and access opening 206, and a plurality of flanges 208. Flanges 208 cooperate with lips (not shown) in a base so that a user may place the cover 202 on the base and twist it so that the flanges cooperate with the lips to secure the base and the cover. Other fasteners may be used to secure a cover and a base. Reversibly joinable fasteners may be used. Examples of fasteners are friction fit, tongue-and-groove, mortise and tenon, latches, cam locks, and buckles. A cam lock is a type of latch having a latch base and a cam. The latch base is where a key or tool is used to rotate the cam, which is what does the latching. Opening 204 provides for a user to reach in and out of the feeder assembly, for instance, to attend to changing food or water.

Figure 7:
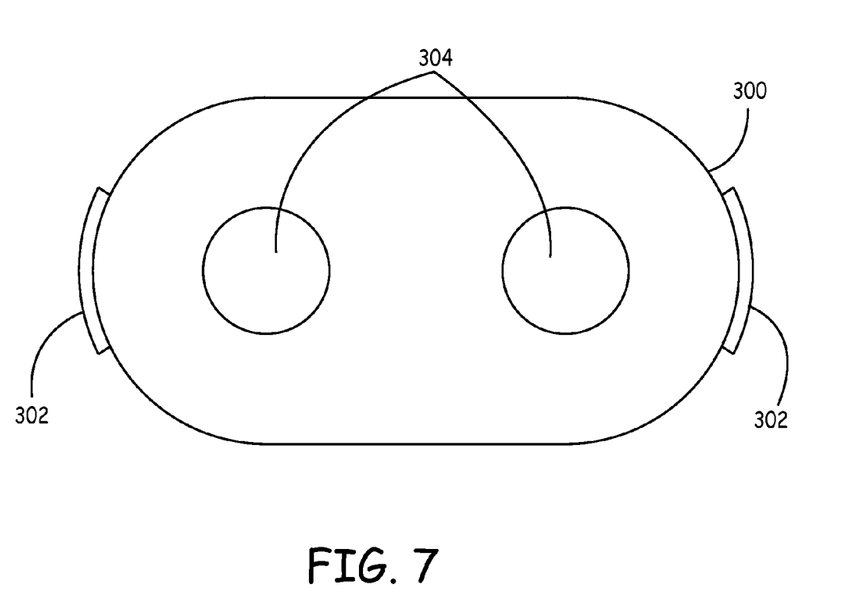
FIG. 7 is a plan view of an alternative embodiment of a cover.

The cover may be of any convenient shape, e.g., cuboidal, domed, semispherical, igloo-shaped, or oval (FIG. 7). FIG. 7 is a plan view of cover 300 having an oval shape, two openings 304, and fastening flanges 302.

Figure 8:
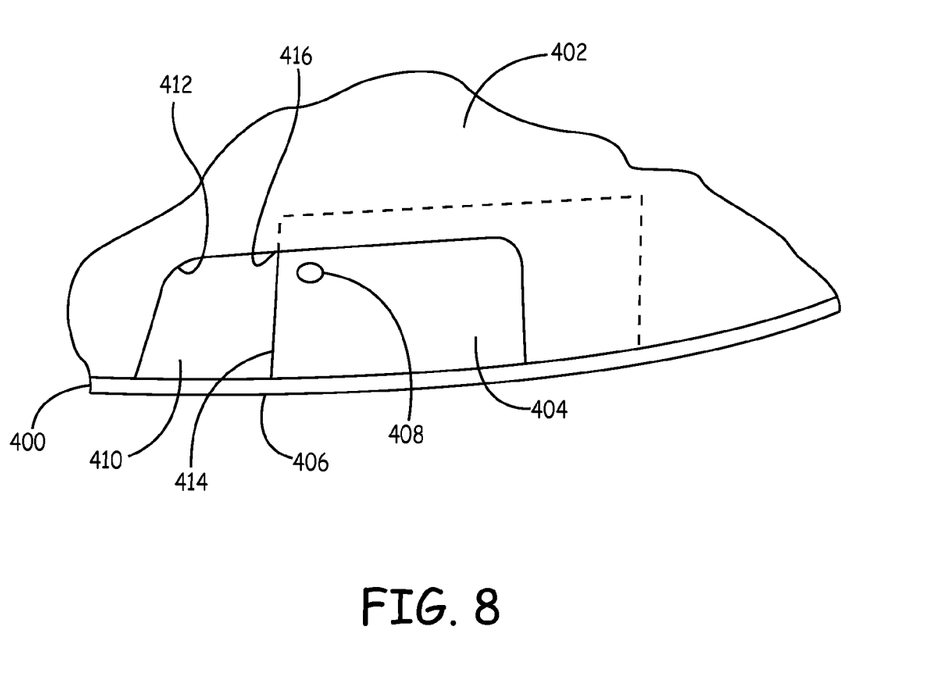
FIG. 8 is a partial perspective view of an embodiment of a pet feeder entryway.

FIG. 8 depicts alternative assembly 400, with cover 402, door 404, and base 406. Door 404 has handle 408. Entryway 410 has an arcuate side 412 defined by cover 402 and a straight side 414 defined by door 408. The cover and door form a right-angled opening 416. In contrast, the embodiment of FIGS. 1-5 depict an entryway 142 that has two arcuate sides.

In fact, the arcuate sides of the embodiment of FIGS. 1-5 are mirror-images of each other. In these embodiments, an axis of symmetry (reflection axis) exists that is vertical and in the plane of the entryway: the curved corners 120, 132 are on either side of the axis of symmetry and are mirror images, i.e., they have reflection symmetry across the reflection axis. The entryway, as depicted, has a straight bottom side (at the base) and a straight top side (opposing the bottom side) that are connected by substantially parallel vertical sides that join the top side via curved corners. The symmetry is preserved through all of the positions of the door.

Figure 9:
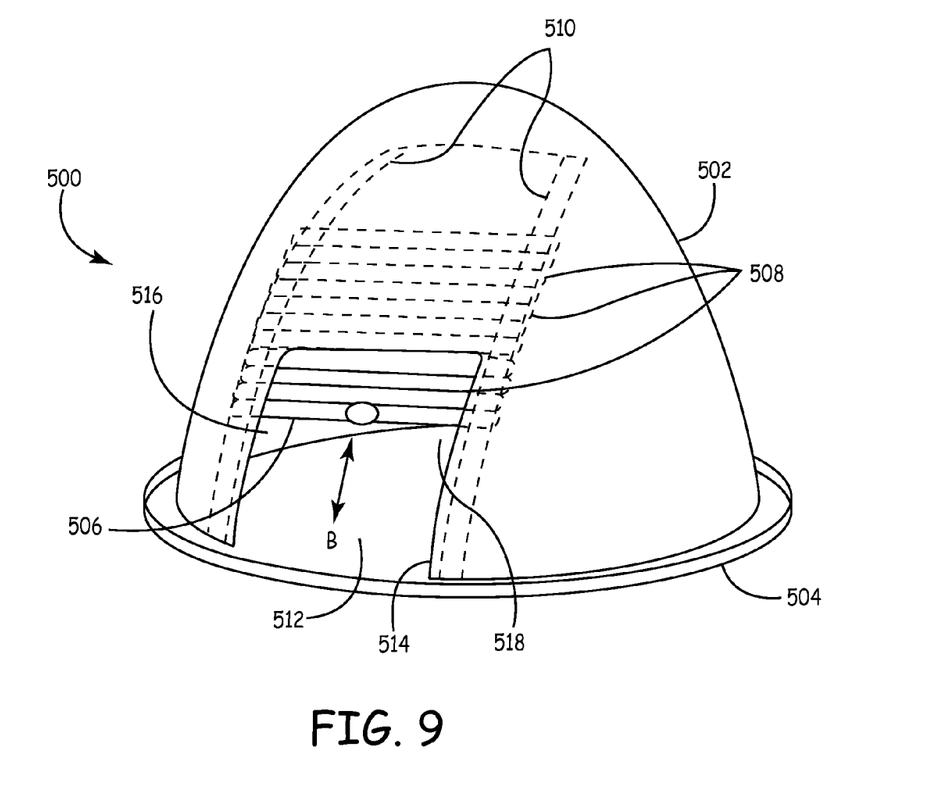
FIG. 9 is a perspective view of an alternative embodiment of a pet feeder.

FIG. 9 depicts an alternative embodiment with a doorway that closes the entryway from top-to-bottom. Feeder 500 has cover 502, base 504, and door 506. Door 506 has a plurality of hinges 508 that bend as door 506 is moved. In use, a user grasps door 506 and moves it up or down as indicated at arrow B, with door 506 sliding in tracks 510 to increase or decrease the size of entryway 512. Cover 502 has access opening 514 that is blocked or left unblocked by door 506. Corners 516 and 518 are not curved but are instead right angles.

Figure 10A:
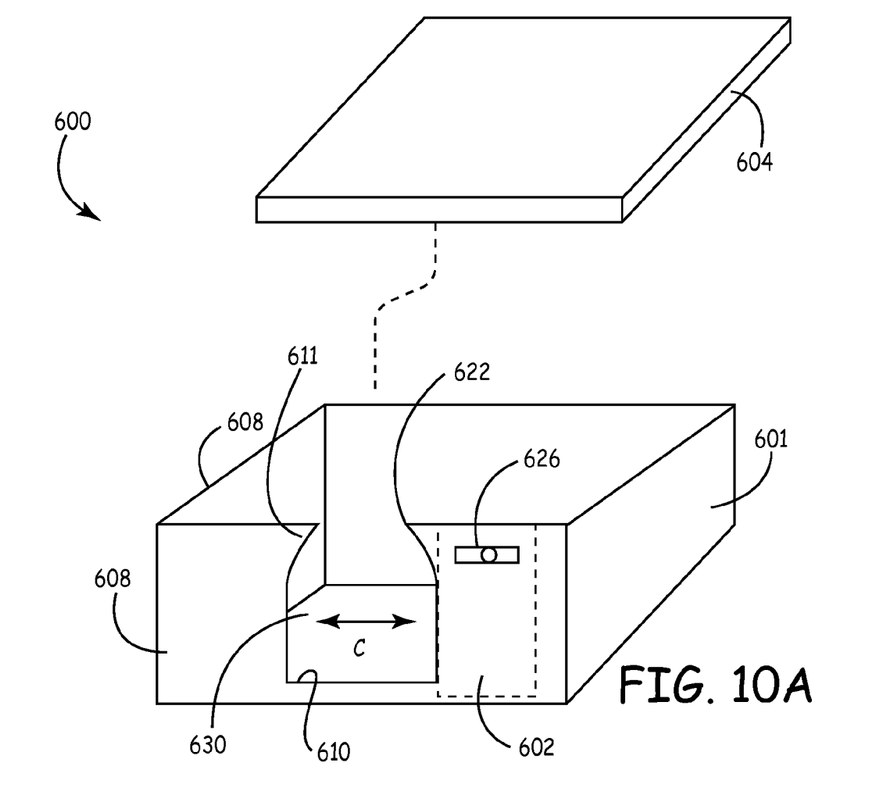
FIG. 10A is an alternative pet feeder with the cover and base shown as an assembly.
Figure 10B:
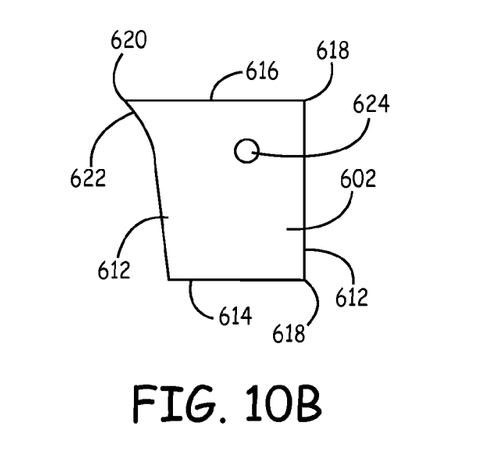
FIG. 10B is an elevated view of the door of FIG. 10A.

FIGS. 10A and 10B depict feeder 600, with base 601, door 602, and cover 604. Base 602 has a plurality of sides 608 and a lateral access opening 610 provided by way of a cut-out from one of the sides. Opening 610 includes arcuate portion 611. Door 602 has vertical sides 612, bottom side 614, and top side 616, with right-angle corners 618 and corner 620 having arcuate portion 622. Door 602 is attached to base 601, e.g., by placement in a slot or with interlocking grooves (not shown), with knob 624 projecting through door access slot 626. Accordingly, the base is the bottom, the cover is at the top, and the sides of the base are located laterally. The door moves side-to-side. A user moves door 602 as indicated at arrow C to control dimensions of entryway 630 that is the portion of access opening 610 that is not blocked by door 602. As the door is moved over the access opening, the entryway has reflection symmetry across a vertical reflection axis in all of the blocking positions. Arcuate portions 611 and 622 provide curved corners. Placement of the cover 604 on the base 601 prevents entry except through the entryway. A fastener, e.g., a reversible fastener may be used to secure the cover to the base, e.g., by snapping, friction fit, mortise-and-tenon, by latches.

In other embodiments, the symmetry may be broken while preserving the roundness of the top corners of the entryway.

The base and cover may be any of a variety of shapes. In some embodiments, the base and cover are unitary or permanently attached to each other.

Accordingly, an embodiment of a pet feeder is a feeder with a pet entryway defined by an access opening or an access opening partially blocked by a door. The entryway is the hole or other passage the pet goes through. If there is nothing blocking the access opening, then the entryway is an identity with the access opening. If the door is partially blocking the access opening, then the entryway is the remaining space. The feeder has a base that defines a bottom and a cover that fit together (preferably reversibly) to create an interior. The access opening can be in the cover, e.g., as a hole or a cut-out. Alternatively, the base could have the opening, with the cover being a lid. Or the access opening could be defined by the combination of the base and the cover together, e.g., with both of them having a cut-out that mate to form the access opening with assembled.

The pet feeder may have a variably positionable door movable to a plurality of blocking positions that at least partially block the access opening to thereby control the dimensions of the entryway. Block is a term used herein that means to actually control the size of the entryway. For instance, patio doors that slide open and closed are familiar to most persons and control the dimensions of an entryway for the patio and a house. On the other hand, a swinging door is only blocking when it is effectively closed. The swinging door is otherwise an obstruction to someone passing through the door but the door does not perform a blocking function as that term is used herein. Embodiments have been presenting herein wherein an access opening for a pet feeder is slidingly blocked by a door. Further embodiments would be a rotating or pivoting door that can be moved over the access space, or a sphincter that can be closed-up or opened-up to control the door dimensions.

The door may have a plurality of blocking positions. These may range from 0% to 100%; artisans will immediately appreciate that all the ranges and values within the explicitly stated ranges are contemplated. For instance, the door may provide for a continuous range of blocking, with the positions comprising between 5% and 80% blocking. Or the door could be completely closable.

The door may be variably positionable by fixing it at various predetermined points (e.g., a plurality of stops or snap-fittings) or continuously variable, i.e., can be infinitely adjusted within its predetermined range.

One embodiment is a door that is attachable to the cover and/or the base in any of a variety of predetermined positions, e.g., the door has one or more prongs that fit into any of a plurality of holes. In use, the assembler snaps the door into the holes.

Figure 11A:
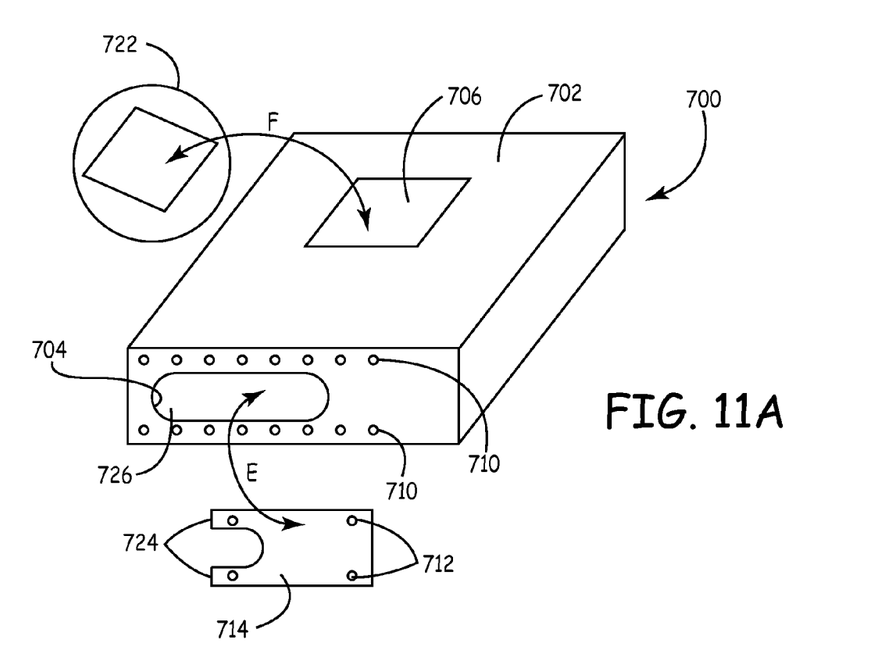
FIG. 11A is a perspective view of an embodiment of the invention.
Figure 11B:
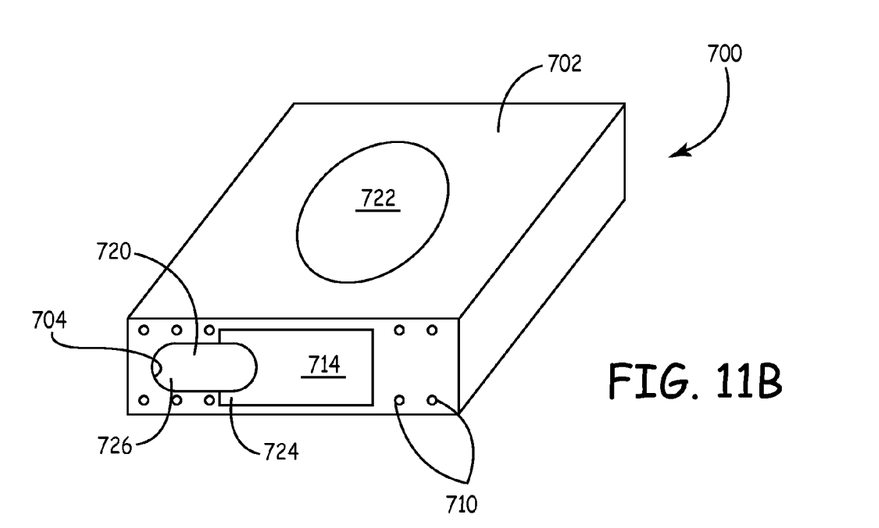
FIG. 11B is a perspective view of the embodiment of FIG. 11A.

FIGS. 11A-11B depict an embodiment, with feeder 700 having a container 702 that defines an interior space with lateral access opening 704 and (optionally) vertical opening 706 that is substantially perpendicular to opening 704. A plurality of recesses 710 accept prongs 712 on door 714. As depicted, the prongs are on the face of the door that is the interior face of the door; the other face of the door is the exterior face. Door 714 is mounted on container 702 to at least partially block lateral access opening 704 by pressing prongs 714 into recesses 710. Entryway 720 is thus sized by a user to be a percentage of the available access opening dimension. Lid 722 is reversibly fit into opening 706. Other fasteners may be used as alternatives to the fasteners depicted. This embodiment uses a door with two arcuate projections 724 that provide a match to curve 726 in container 702 so that the entryway may be provided with refection symmetry. In this embodiment, there is symmetry over a horizontal axis and also a vertical axis, with the two axes being perpendicular to each other. The vertical opening 706 is defined as the top of the container since it would typically be on top during normal intended use.

The entryway may be made to be free of sharp corners, e.g., with all of the corners rounded. Or the corners at the top of the entryway may be rounded without regard to the other corners, if any. The pets may tend to brush against the upper corners so that preferentially rounding them is an embodiment. A curved corner refers to a corner that is not an intersection of two straight edges.

Access openings may be sized as desired for the intended pet. Examples of sizes are from 25 square inches to 400 square inches; artisans will immediately appreciate that all the ranges and values within the explicitly stated ranges are contemplated. The entryway may be controlled to provide a range of sizes ranging from 0% to 100% of the access opening; artisans will immediately appreciate that all the ranges and values within the explicitly stated ranges are contemplated. Embodiments therefore include an access opening of about 49 square inches (e.g., a substantially square hole that is 7 inches by 7 inches) and an entryway that blocks the access to provide between 10% and 100% of the area, i.e., from 4.9 to 49 square inches. Alternatively, the relationship can be expressed in terms of percentage blocking, e.g., an opening of 100 square inches that is blocked between 5% and 80%, i.e., 5 square inches or up to 80 square inches are blocked-off to leave an entryway of between 95 and 20 square inches. All of these sizes and percentages may be freely mixed-and-matched. Further, the access opening may be sized to accommodate access for a typical food bowl and/or water dish to be passed through the access opening.

One aspect of the entryway is that it may be symmetrical regardless of which blocking position a doorway is in. The door and access opening may cooperate to define an entryway that has reflection symmetry across a reflection axis in all of the blocking positions, with the entryway comprising a first rounded corner on one side of the reflection axis and a second rounded corner on the other side of the reflection axis. The door can be equipped with a projection of other portion that provides a curved corner to the entryway. The cover may be configured to provide the entryway with a rounded corner.

The door may be mounted in a wide variety of manners. In one embodiment, there is a track in the base and the door slides in the track. If the base is curved, the door may also have a curvoplanar shape, i.e., is substantially planar but has a curvature that allows it to be moved adjacent the cover. Accordingly, an embodiment is a cover that comprises a curved shell and a curved door disposable next to the curved shell and is movable relative to, and adjacent to, the curved shell. The door may also, or alternatively, have a rim to cooperate with a flange or slot in the shell, with the door being supported or at least guided thereby.

The cover may further comprise a door control slot. A door control slot is an opening that allows access to the door without reaching through the entryway. For instance, a knob on the door that passes through the slot. The knob may be graspable by a user to control movement of the door through the blocking positions.

There should be enough space to accommodate a typical amount of food, as would be normal for feeding the intended pet. Domestic pets are generally contemplated to the exclusion of farm animals such as cows, pigs and the like. Accordingly, at least about 1 cubic foot that accommodates food for the pet may be provided, or various sized, e.g. between 0.5 to 10 cubic feet; artisans will immediately appreciate that all the ranges and values within the explicitly stated ranges are contemplated.

The cover itself may take a variety of shapes, e.g., including a dome. The base and the cover may be reversibly fastenable to each other. Alternatively, or additionally, the cover may have a vertical opening that a user can reach through.

Figure 12:
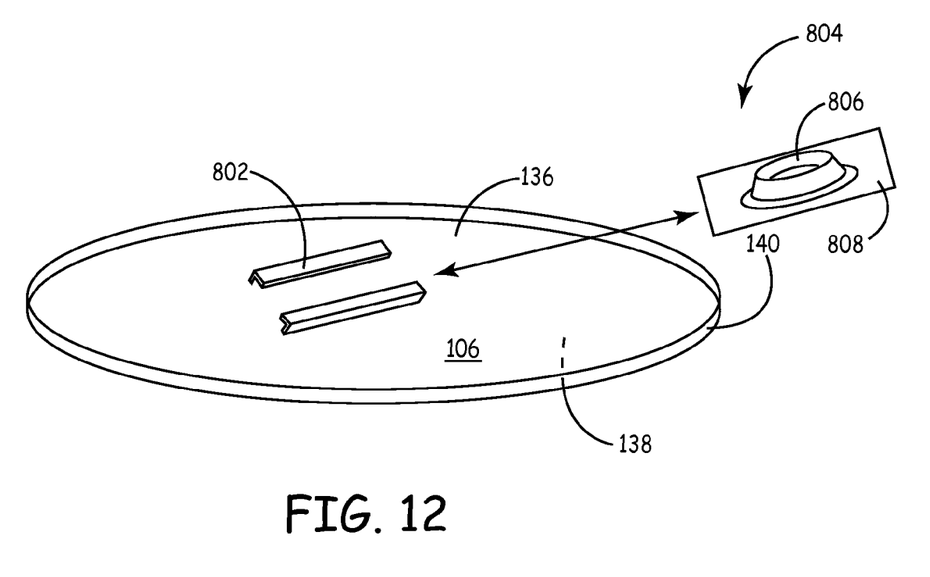
FIG. 12 is a perspective view of the base of FIG. 1, with fasteners disposed thereon.

FIG. 12 depicts base 106 with fasteners 802 that receive bowl assembly 804. Bowl assembly 804 has bowl 806 attached to base 808 that is received by fasteners 802. A user slides the assembly 804 in or out of fasteners 802, which are depicted as flanges that cooperate to receive base 808. The user may take the bowl in and out of the feeder as desired. Various reversible fasteners may be used, e.g., mortise-and-tenon, pegs-and-holes, snapping fasteners, or flanges on assembly 804 received by slots in the base.

Figure 13A:
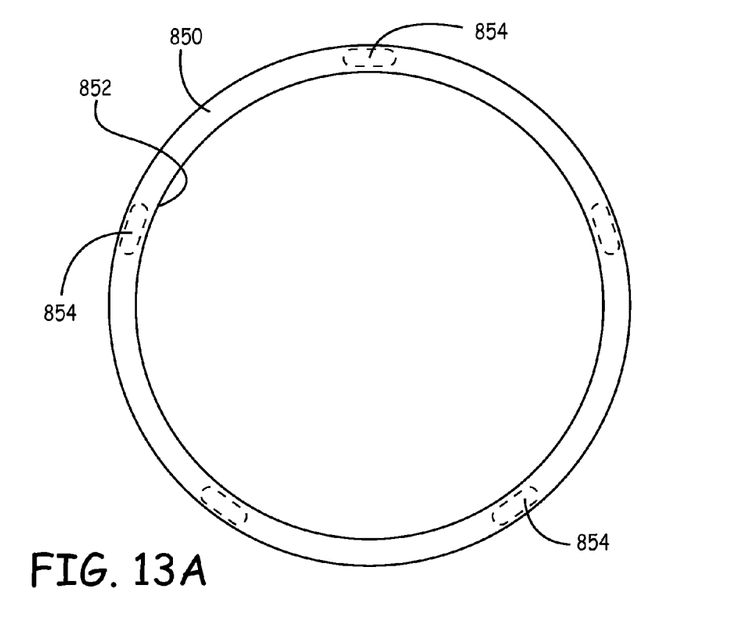
FIG. 13A is a perspective view of a covering for a feeder.
Figure 13B:
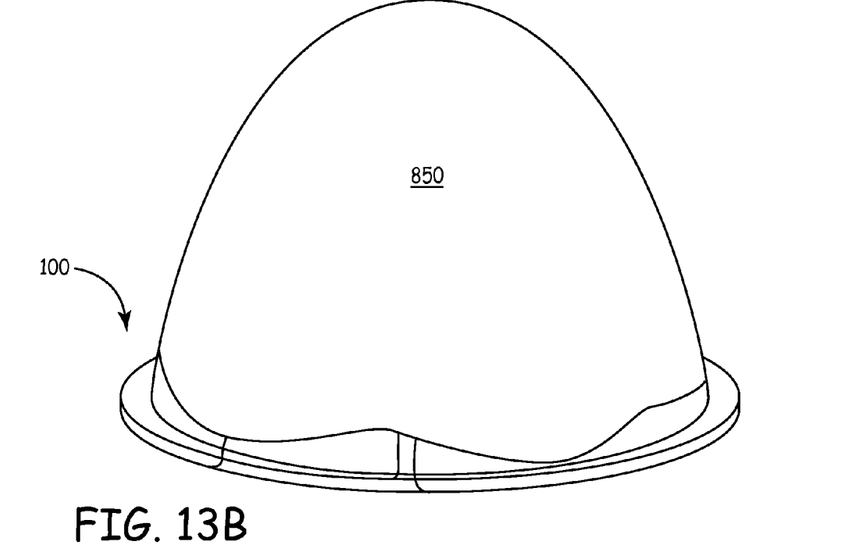
FIG. 13B is a perspective view of the cover of FIG. 13A in place over a feeder.

The feeder may further be provided with a cover. The cover may have weights at its edges so the cover will stay in place and be easily removed. FIG. 13A depicts cover 850 with a circular shape having hem 852 and weights 854 secured inside the hem. In use, the cover is placed over a feeder, e.g., as at FIG. 13B wherein cover 854 is placed over feeder 100. The cover may have various shapes, e.g., circular, square, scalloped. The cover may be made of a flexible material, e.g., cloth, denim, nylon. The cover may substantially cover-up the entire feeder or partially cover the same. The cover may have an opening that is proportioned to the entryway of the feeder. The opening may be reversibly covered by a flap.

Additional Description of Embodiments

1. A pet feeder with a pet entryway defined by an access opening or an access opening partially blocked by a door, the feeder having a base that defines a bottom, the feeder comprising a base and a cover that define an interior (e.g., of at least 1 cubic foot), with the cover and/or base having an access opening, and a variably positionable door movable to a plurality of blocking positions that at least partially block the access opening to thereby control the dimensions of the entryway.
2. A method of using a pet feeder comprising attaching a base to a cover, the base and the cover together defining an interior (e.g., of at least 1 cubic foot), with the feeder having a lateral access opening and a variably positionable door movable to a plurality of blocking positions that at least partially block the access opening to thereby control the dimensions of the entryway.
3. A pet feeder kit for assembly of a pet feeder that includes a pet entryway defined by an access opening or an access opening partially blocked by a door, the feeder having a base that defines a bottom, the kit comprising
   a base and a cover that define an interior (e.g., of at least 1 cubic foot), with the cover and/or base having an access opening, and
   a variably positionable door movable to a plurality of blocking positions that at least partially block the access opening to thereby control the dimensions of the entryway.
4. As at any of 1-3 wherein the door provides for a continuous range of blocking, with the positions comprising between 5% and 80% blocking.
5. As at any of 14 wherein the positions further comprise a 100% blocking position.
6. As at any of 1-5 wherein the door is slidable relative to the cover to achieve the blocking positions.
7. As at any of 1-6 wherein the door and access opening cooperate to define an entryway that has reflection symmetry across a reflection axis in all of the blocking positions, with the entryway comprising a first rounded corner on one side of the reflection axis and a second rounded corner on the other side of the reflection axis.
8. As at any of 1-7 wherein the door comprises an arcuate projection that provides the entryway with the first rounded corner when the door is in a blocking position.
9. As at any of 1-8 wherein the cover provides the entryway with the second rounded corner.
10. As at any of 1-9 wherein the cover further comprises a door control slot, with a knob on the door passing through the slot and the knob being graspable by a user to control movement of the door through the blocking positions.
11. As at any of 1-10 wherein the cover comprises a dome.
12. As at any of 1-11 wherein the base and the cover are reversibly fastenable to each other.
13. As at any of 1-12 wherein the cover comprises the access opening.
14. As at any of 1-13 wherein the base comprises a slot for receiving the door.
15. As at any of 1-14 further comprising a vertical opening.
16. As at any of 1-15 further comprising sliding the door over the entryway to reduce the dimensions of the entryway without fully blocking the access opening.

The invention claimed is:
1. A pet feeder comprising:
a base;
a cover comprising a curved shell attached to the base, wherein an access opening is formed between the cover and the base;
a door movably attached to the cover so that the door is laterally movable to a plurality of blocking positions for the access opening that controls dimensions of an entryway to exclude access to a pet while allowing a relatively smaller pet to enter, and the door is curved and moves laterally adjacent to the curved shell of the cover, wherein the cover further comprises a door control slot that is separated from the access opening, with a knob on the door passing through the door control slot and the knob being graspable by a user to control movement of the door;
wherein the curved shell comprises a flange or second slot and the door comprises a rim to cooperate with the flange or second slot of the curved shell with the door being supported or guided thereby,
wherein the base comprises a slot for receiving the door and is adapted to receive a bowl for food and/or water for a pet,
wherein the base and cover define an interior volume of 1 to 10 cubic feet, and
wherein the access opening has a maximum area that is in a range from 25 to 400 square inches.
2. The pet feeder of claim 1 wherein the door provides for a continuous range of blocking, with the positions comprising between 5% and 80% blocking.
3. The pet feeder of claim 1 wherein the door provides for a continuous range of blocking, with the positions comprising between 0% and 100% blocking.
4. The pet feeder of claim 1 wherein the door is slidable relative to the cover to achieve the blocking positions.
5. The feeder of claim 1, wherein the cover is dome shaped and substantially defines the interior volume.
6. The feeder of claim 5 wherein the base and the cover are reversibly fastenable to each other.
7. The feeder of claim 1 further comprising a vertical opening.
8. The pet feeder of claim 1, wherein the cover includes one or more snapping fasteners and the base includes one or more corresponding slots so that the cover is secured to the base by snapping the snapping fasteners into the slots in the base.
9. The pet feeder of claim 1, further comprising a bowl that is removable from the feeder.
10. The pet feeder of claim 1, wherein the cover includes a handle on an exterior side.
11. The pet feeder of claim 1, wherein the cover includes an opening in an upper portion of the dome shaped cover so that a user can reach in and out of the pet feeder to change food and water.
12. The pet feeder of claim 1 wherein the door travels along a curved path as it is moved laterally adjacent to the curved shell of the cover.
13. A pet feeder kit comprising:
a base;
a cover comprising a curved shell having an access opening, wherein the cover is configured for attachment to the base;
a door that is configured for attachment to the cover so that the door has a plurality of blocking positions that control dimensions of the access opening to form an entryway to exclude access to a pet while allowing a relatively smaller pet to enter, and the door is curved and moves laterally adjacent to the curved shell of the cover;
wherein the cover further comprises a door control slot that is separated from the access opening, with a knob on the door passing through the door control slot and the knob being graspable by a user to control movement of the door;
wherein the curved shell comprises a flange or second slot and the door comprises a rim to cooperate with the flange or second slot of the curved shell with the door being supported or guided thereby,
wherein the base comprises a slot for receiving the door and is adapted to receive a bowl for food and/or water for a pet,
wherein the base and the cover when attached define an interior volume of 1 to 10 cubic feet, and
wherein the access opening has a maximum area that is in a range from 25 to 100 square inches.
14. The pet feeder kit of claim 13 wherein the door comprises a prong that fits into any of a plurality of holes so the door is thereby in the fixed position.
15. The pet feeder kit of claim 13, wherein the cover includes one or more snapping fasteners and the base includes one or more corresponding slots so that the cover is secured to the base by snapping the snapping fasteners into the slots in the base, and
wherein the cover includes an opening in an upper portion of the dome shaped cover so that a user can reach in and out of the pet feeder to change food and water.
16. The pet feeder kit of claim 15, further comprising a bowl that is removable from the feeder.
17. The pet feeder of claim 13 wherein the door travels along a curved path as it is moved laterally adjacent to the curved shell of the cover.
18. The pet feeder of claim 13 wherein the door provides for a continuous range of blocking, with the positions comprising between 0% and 100% blocking.
19. A pet feeder comprising
a. a base having:
i. an interior side,
ii. an exterior side, and
iii. a plurality of slots on the interior side of the base;
b. a dome shaped cover having:
i. a plurality of snaps on an exterior side of the dome shaped cover that correspond with the slots in the base so that the snaps are pressed into the slots securing the dome shaped cover to the base, and ii. an opening in an upper portion of the dome shaped cover having a curved shell so that a user can reach in and out of the pet feeder to change food and water;

c. a door movably attached to the dome shaped cover so that the door is movable to a plurality of blocking positions for the access opening that control dimensions of an entryway to exclude access to a pet while allowing a relatively smaller pet to enter, wherein the door includes a knob on its exterior side passing through a door control slot in the cover so that a user can move the knob to control movement of the door to adjust the size of the entryway to a desired size and the door is curved and moves laterally adjacent to the curved shell of the cover, said door control slot being separated from the access opening;

wherein the curved shell comprises a flange or slot and the door comprises a rim to cooperate with the flange of slot of the curved shell with the door being supported or guided thereby, and the base comprises a slot for receiving the door and is adapted to receive a bowl for food and/or water for a pet, wherein the base and the dome shaped cover define an interior volume from 1 to 10 cubic feet, and wherein the access opening has a maximum area that is in a range from 25 to 100 square inches.

\* \* \* \* \*

UNITED STATES PATENT AND TRADEMARK OFFICE
CERTIFICATE OF CORRECTION

PATENT NO. : 8,578,883 B2  Page 1 of 1
APPLICATION NO. : 12/630969
DATED : November 12, 2013
INVENTOR(S) : Troy Pfingsten and Mark O'Melia It is certified that error appears in the above-identified patent and that said Letters Patent is hereby corrected as shown below:

In the Specifications

Column 6, line 61 between 1 and 4 insert a -- - --

Signed and Sealed this
First Day of April, 2014

Michelle K. Lee
*Deputy Director of the United States Patent and Trademark Office*